March 31, 1964     P. P. NEWCOMB     3,126,702

ROCKET NOZZLE DESIGN

Filed May 23, 1960

INVENTOR

PHILIP P. NEWCOMB

BY *Raymond W. Colter*

ATTORNEY

United States Patent Office 3,126,702
Patented Mar. 31, 1964

3,126,702
ROCKET NOZZLE DESIGN
Philip P. Newcomb, Manchester, Conn., assignor to United Aircraft Corporation, East Hartford, Conn., a corporation of Delaware
Filed May 23, 1960, Ser. No. 31,118
7 Claims. (Cl. 60—35.6)

This invention relates to a rocket nozzle construction which may be utilized in a liquid propellant rocket motor.

In liquid propellant rocket motors the temperature generated when the propellants are burned efficiently, are so high that the wall of the combustion chamber and discharge nozzle cannot withstand them for any length of time and rapidly burn out.

It is an essential object and purpose of this invention to provide a construction comprising a radially spaced annular outer shell and an inner liner maintained in concentric spaced relationship by circumferentially and preferably equally spaced, axially extending incompressible thermally insulated members. The inner liner is formed of refractory material and under operating conditions is placed under compression by compressive forces exerted around its exterior surface. The incompressible thermally insulated members that space apart the outer shell and inner liner provide continuous support therebetween and thermally insulate the outer shell from the liner within which the propellant fluid is burned.

The present construction is intended as an improvement over the U.S. Patent 2,706,887 to H. B. Brow, granted April 26, 1955 inasmuch as the patented structure does not provide incompressible thermally insulated spacer members between the outer shell and inner liner so as to reduce heat transfer therebetween and maintain them in concentric spaced relation. Also, the patented structure does not provide incompressible thermally insulated spacer members, located between the outer shell and inner liner, that extend axially substantially the full length of the shell and liner of the rocket motor from closely adjacent the fuel injector end, along the throat portion to closely adjacent the discharge end.

Figure 1:
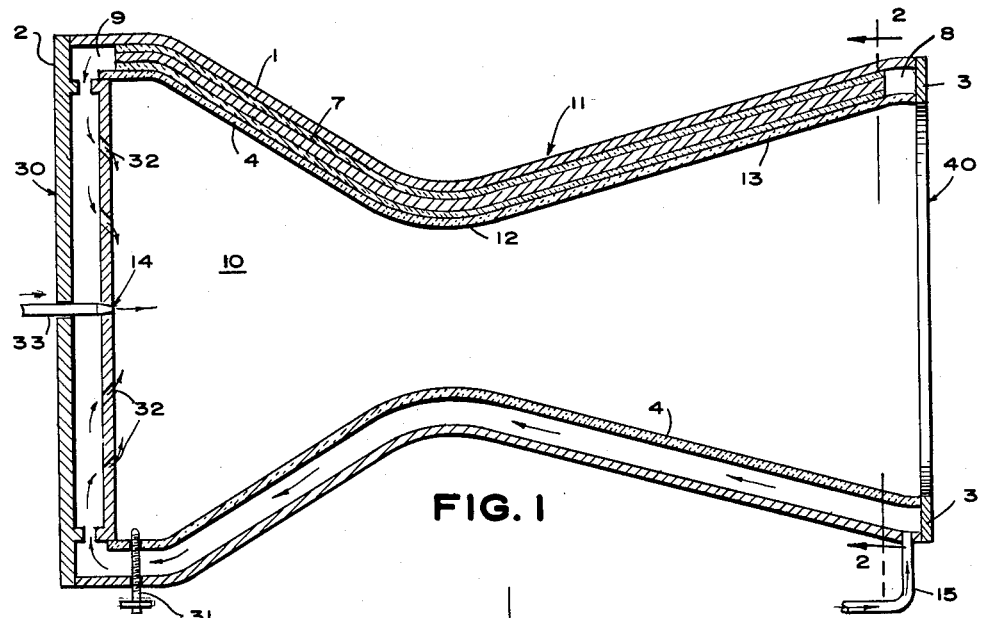
FIGURE 1 is an axial sectional elevation of a rocket motor construction showing the rocket nozzle construction of the invention.

The load carrying hollow outer shell 1 of a liquid propellant rocket motor is shown in FIG. 1 as closed at its forward end by a hollow head 2 which is attached to the outer shell 1. The rear or discharge end 40 of the motor is open. Within the hollow outer shell 1 is located a concentrically arranged frangible liner 4 that is radially spaced from the outer shell 1 by means of at least three generally axially extending thermally insulated spacer members 5 which are circumferentially and preferably equally spaced around the longitudinal axis of the liner 4. The space between the shell 1 and liner 4 is closed by an annular plate 3 at the discharge end 40.

The liner 4 may be of a high heat resistant frangible material, for example, graphite and ceramic, having poor heat conductive properties, and is preferably of a one piece construction. The liner 4 encloses a combustion chamber 10, a discharge or thrust nozzle 11 including the constricted nozzle throat 12, and an expanded section 13.

The insulated spacer members 5, of which three have been shown in the drawings, are each composed of a round metal rod 6 that is covered with incompressible thermal insulation 7 incorporating a material such as asbestos or magnesia, which insulation 7 is disposed in intimate substantially line contact with the shell 1 and liner 4.

The insulated spacer members 5 are of slightly less axial extent than the outer shell 1 and the liner 4 and thus annular manifolds 8 and 9 are formed at opposite ends of the rocket motor.

Figure 2:
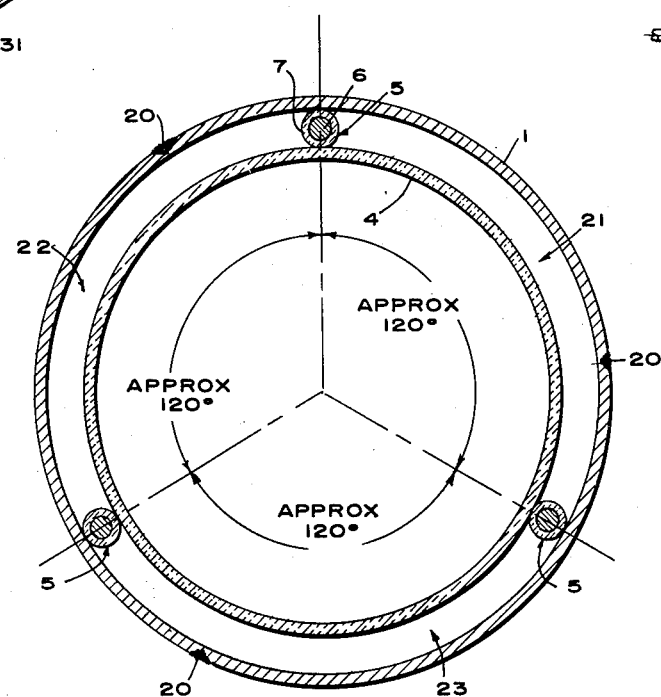
FIGURE 2 is a section taken on line 2—2 of FIG. 1.

The outer shell 1 is preferably formed of several sections of high strength material that are secured together by longitudinal welds 20 after assembly around the liner 4 and insulated spacer members 5. The generally axially extending members 5 are in intimate substantially line contact with the adjacent walls of the shell 1 and liner 4, and being spaced apart circumferentially of the shell and liner, form axial passages between the shell 1 and liner 4, such as shown in FIG. 2 at 21, 22 and 23. The axially extending spacer members 5 are held against movement relative to the shell 1 and the liner 4 by the compressive force applied by the shell 1. The line contact between the contacting surfaces of the shell 1, liner 4, and the axially extending members 5 prevents cross flow between adjoining passages 21, 22 and 23, and prevents heat transfer from the liner 4 to the shell 1.

One of the liquid fuel components is supplied under pressure by fuel duct 15 located adjacent the discharge end 40. By means of the manifold 8 this fuel component flows to the passages, such as shown at 21, 22 and 23, located between the outer shell 1 and liner 4.

At the fuel injector end 30 of the combustion chamber 10, the centrally placed fuel injector 14 supplies another fuel component to the combustion chamber 10 from duct 33. An igniting device 31 extends through the concentric walls of the shell 1 and liner 4, into the combustion chamber 10. Fuel injection ports 32 are provided to direct the fuel component from the passages 21, 22 and 23, that lie between the shell 1 and liner 4, into the combustion chamber 10. The ports 32 direct the stream of this fuel component so as to impinge on the stream of the other fuel component issuing from the fuel injector 14.

The fuel component entering the passages 21, 22 and 23 through the fuel duct 15 is under sufficiently high pressure that it discharges through fuel injection ports 32 into the combustion chamber 10 at a pressure somewhat greater than that obtaining in the combustion chamber 10 under operating conditions. This is true in spite of the pressure drop in the liquid fuel component as it traverses the passages 21, 22 and 23 from the discharge end 40 of the motor to fuel injector end 30.

The metal rods 6 serve as reinforcing members for the thermal insulation 7. The liner 4, formed of a high heat resistant material having poor heat conductive properties, insulates the combustion chamber 10 and nozzle 11 from loss of heat from the high temperature products of combustion, thus maintaining the effluent gases at a high temperature and high pressure necessary for efficient operation. The external surface of the liner 4 is in line contact with the external surfaces of the spacer members 5, providing a minimum path of conductive flow of heat from the liner to the spacer members while allowing cooling fluid to contact substantially the entire external surface of the liner preventing the formation of any local hot spots in the liner. In view of the substantially line contact between the spacer members 5 and the external surface of the liner 4, the poor heat conductive properties of the spacer members which are constantly bathed, over their entire surface, by the relatively cool fuel component flowing through the jacket, and the substantially line contact between the spacer members and the interior surface of the outer shell 1, no heat from the combustion chamber and nozzle will be conducted to the outer shell, thereby preventing the formation of local hot spots in the outer shell and consequent weakening thereof, as would occur in structures having metal spacer members in heat conductive relation with the liner and with the outer shell.

According to the present invention the passages between the outer shell and the high heat resistant inner liner are filled with a substantially incompressible liquid that, under operating conditions of the rocket motor, is at pressures substantially higher than the operating pressures within the combustion chamber, the nozzle throat, and the expanded section, thus placing the inner liner under compression throughout its length.

Since the incompressible thermally insulated axially extending spacer members are in substantially line contact with the outer shell and the frangible inner liner, the spacer members provide uninterrupted support between the shell and liner from closely adjacent the injector end across the nozzle to closely adjacent the discharge end of the rocket motor. The provision of uninterrupted support between shell and liner is especially important at the critical area at the throat of the nozzle. Contact between the outer shell and inner liner is eliminated due to the provision of at least three of the insulated spacer members equally spaced around the circumference of the liner. The outer shell is thus insulated from the liner through which flow the high temperature operating gases.

The present structure also provides means for maintaining the high heat resistant liner under compression during operating conditions. The material of which the liner is formed, such as ceramic and graphite, has an inherent substantial resistance to compressive stresses, as is well known in the art.

The liquid fuel component which is forced under pressure between the outer shell and the liner, in addition to maintaining the liner under compression, acts as a coolant for removing heat from the adjacent surfaces of the liner and shell. Also the liquid fuel between the shell and liner, being under pressure, forms a substantially incompressible layer of coolant liquid therebetween.

While there have been shown and described the fundamental novel features of the invention as applied to a single modification, it will be understood that various omissions and substitutions and changes in the form and details of the device illustrated may be made by those skilled in the art without departing from the spirit of the invention. It is the intention therefore to be limited only as indicated by the scope of the following claims.

I claim:

1. A thrust nozzle construction including a load carrying annular outer shell, a high heat resistant refractory inner liner, and circumferentially spaced, generally axially extending spacer members having a thermal insulating coating in substantially line contact with said shell and liner holding them in radially spaced concentric relationship and providing continuous support therebetween to define a fluid jacket between said shell and liner.

2. A nozzle construction as in claim 1 in which the inner liner is composed of a high heat resistant frangible material, and means operatively connected to the space between the shell and liner and supplying a liquid fuel component under pressure to said space surrrounding said liner at a pressure greater than nozzle operating pressures, thereby placing said liner under compression.

3. A nozzle construction as in claim 1, wherein said thermal insulating coating is composed of incompressible insulation material.

4. In a rocket-type motor, having a combustion chamber and a reaction propulsion nozzle, said combustion chamber, at one end, having an inlet for a fuel supply and being connected, at its other end, with one end of said nozzle constituting an inlet end for the nozzle, the other end of said nozzle being open to the ambient atmosphere to constitute a discharge end, said combustion chamber and nozzle construction including a hollow outer shell, a hollow high heat resistant refractory inner liner having poor heat conductive properties radially inwardly spaced from said outer shell and concentric therewith, the space between said shell and liner being divided into a plurality of passages by generally axially extending preferably equally circumferentially spaced incompressible spacer members comprising elongated metal rods having a thermal insulating coating, said spacer members extending uninterruptedly from closely adjacent the discharge end of the nozzle to adjacent the inlet end of the combustion chamber, and being in substantially line contact with said shell and liner throughout the extent of said spacer members.

5. A nozzle construction as in claim 4, in which means operatively connected with the plurality of passages supplies a liquid fuel component under pressure thereto, the pressure within said passages being greater than the operating pressure within said nozzle, thereby providing a substantially incompressible layer of said fuel component between said shell and liner and placing said liner under compression.

6. A nozzle construction as in claim 5, wherein the incompressible spacer members are formed of metal rods that are coated with incompressible thermal insulating material.

7. A thrust nozzle construction including an outer shell, an inner concentric high heat resistant frangible refractory liner having poor heat conductive properties including the nozzle throat, radially spaced from said shell by generally axially extending incompressible spacer members having a thermal insulating coating in substantially line contact with said shell and liner throughout the extent of said members and thereby providing continuous support therebetween, said spacer members extending along the nozzle throat throughout the axial extent thereof.

References Cited in the file of this patent

UNITED STATES PATENTS

| | | |
|---|---|---|
| 2,504,421 | Johnson et al. | Apr. 18, 1950 |
| 2,601,311 | McCormick | June 24, 1952 |
| 2,741,085 | Prentiss | Apr. 10, 1956 |
| 2,795,108 | Saldin | June 11, 1957 |
| 2,933,888 | Africano et al. | Apr. 26, 1960 |
| 2,955,415 | Long | Oct. 11, 1960 |
| 2,956,399 | Beighley | Oct. 18, 1960 |
| 2,958,183 | Singelmann | Nov. 1, 1960 |
| 2,976,679 | Dalgleish | Mar. 28, 1961 |